United States Patent
Begen

(10) Patent No.: US 8,619,602 B2
(45) Date of Patent: Dec. 31, 2013

(54) CAPACITY/AVAILABLE BANDWIDTH ESTIMATION WITH PACKET DISPERSION

(75) Inventor: Ali C. Begen, Vancouver (CA)

(73) Assignee: Cisco Technology, Inc., San Jose, CA (US)

(*) Notice: Subject to any disclaimer, the term of this patent is extended or adjusted under 35 U.S.C. 154(b) by 136 days.

(21) Appl. No.: 12/550,680

(22) Filed: Aug. 31, 2009

(65) Prior Publication Data

US 2011/0051607 A1    Mar. 3, 2011

(51) Int. Cl.
*H04L 12/26*    (2006.01)

(52) U.S. Cl.
USPC ...... 370/252; 370/232; 370/338; 370/395.41; 709/223; 709/224; 709/238

(58) Field of Classification Search
USPC ............ 370/229, 230, 252–253, 232, 395.41; 709/223–224, 226, 233, 227, 238, 231; 348/14.08, 386.1; 379/1.04; 455/509
See application file for complete search history.

(56) References Cited

U.S. PATENT DOCUMENTS

| | | | |
|---|---|---|---|
| 7,680,038 B1 * | 3/2010 | Gourlay | 370/230 |
| 8,064,939 B2 * | 11/2011 | Matta | 455/509 |
| 2003/0056002 A1 * | 3/2003 | Trethewey | 709/238 |
| 2004/0078460 A1 * | 4/2004 | Valavi et al. | 709/224 |
| 2005/0165931 A1 * | 7/2005 | Shur et al. | 709/226 |
| 2006/0031564 A1 * | 2/2006 | Brassil et al. | 709/233 |
| 2006/0256232 A1 * | 11/2006 | Noguchi | 348/386.1 |
| 2007/0061443 A1 * | 3/2007 | Chavda | 709/224 |
| 2007/0248100 A1 * | 10/2007 | Zuberi et al. | 370/395.41 |
| 2008/0091811 A1 * | 4/2008 | Wing et al. | 709/223 |
| 2008/0129817 A1 * | 6/2008 | Faubel et al. | 348/14.08 |
| 2009/0116379 A1 * | 5/2009 | Rahman | 370/229 |
| 2009/0168972 A1 * | 7/2009 | Cioffi et al. | 379/1.04 |
| 2010/0121974 A1 * | 5/2010 | Einarsson et al. | 709/231 |
| 2010/0169471 A1 * | 7/2010 | Allan | 709/223 |
| 2010/0238834 A9 * | 9/2010 | Awais | 370/253 |

* cited by examiner

*Primary Examiner* — Michael Thier
*Assistant Examiner* — Vincelas Louis
(74) *Attorney, Agent, or Firm* — Merchant & Gould

(57) ABSTRACT

Consistent with embodiments of the present invention, systems and methods are disclosed for estimating at least one of a capacity and an available bandwidth of a communications path. Methods may be disclosed comprising: sending a measurement request to a computing device on a network and receiving data responsive to the measurement request. At least one of a capacity and an available bandwidth of a communications path from the sender to the computing device may be estimated based on the received data. The estimation may be sent to the computing device and stored. Transmission settings may be adjusted based on the estimation.

19 Claims, 6 Drawing Sheets

CAPACITY/AVAILABLE BANDWIDTH ESTIMATION WITH PACKET DISPERSION

FIELD OF THE DISCLOSURE

The present disclosure relates to the estimation of capacity and available bandwidth for use in networking applications to increase the efficiency of available resource use.

BACKGROUND

Capacity and available bandwidth estimation may be important in many networking applications. Accurate estimation may allow for using available resources as efficiently as possible without hurting other co-existing flows or creating congestion. A way to regulate the usage of the resources may be to employ admission control. However, admission control may only be applied if a service provider owns the network. Thus, over-the-top (OTT) providers may not be able to offer services that benefit from admission control. Furthermore, admission control parameters may be preset which may lead to sub-optimal operation in networks where available resources are time-varying. Real-time estimations may be used to improve the efficiency of admission control by setting parameters more appropriately. In cases where admission control is not feasible, real-time measurements may be useful.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure.

DESCRIPTION OF EXAMPLE EMBODIMENTS

Overview

Figure 1:
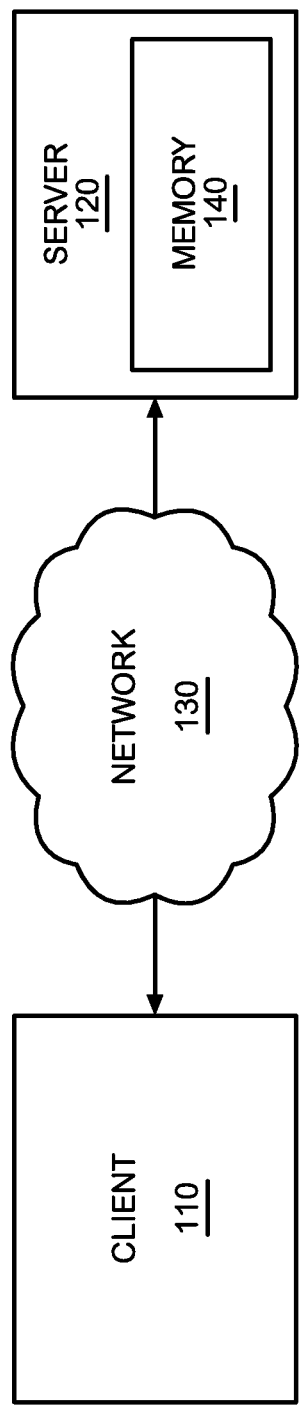
FIG. 1 is a block diagram of an operating environment.

Consistent with embodiments of the present invention, systems and methods are disclosed for estimating at least one of a capacity and an available bandwidth of a communications path. Methods may be disclosed for sending a measurement request to a computing device on a network and receiving data responsive to the measurement request. At least one of a capacity and an available bandwidth of a communications path from the sender to the computing device may be estimated based on the received data. The estimation may be sent to the computing device and stored. Transmission settings may be adjusted based on the estimation.

A system may further be disclosed comprising a server capable of initiating a bandwidth probe and of sending a probing STUN or RTP/RTCP packet to a client in response to the bandwidth probe. The client may be associated with a processor programmed to estimate at least one of a capacity and an available bandwidth based on the received data. The processor may be further programmed to send the estimation results to the server. The system may further comprise a memory capable of storing received estimation results and a processor associated with the server programmed to adjust transmission settings based on the estimation results.

Also disclosed may be a computer-readable medium which stores a set of instructions which when executed performs a method for analyzing network conditions, the method executed by the set of instructions comprising determining that a bandwidth probe needs to be initiated. The instructions may further comprise the steps of initiating a bandwidth probe, wherein the bandwidth probe comprises STUN or RTP/RTCP packets; estimating at least one of a capacity and an available bandwidth; storing the estimations; and adjusting network transmission settings based on the estimation.

Both the foregoing general description and the following detailed description are examples and explanatory only, and should not be considered to restrict the invention's scope, as described and claimed. Further, features and/or variations may be provided in addition to those set for the herein. For example, embodiments of the invention may be directed to various feature combinations and sub-combinations described in the detailed description.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Detailed Description

In Internet Protocol Television (IPTV) applications, many features may rely on the available bandwidth of the access network links. For example, the success of error repair and fast channel change (which may be another form of error repair) operations may be tightly connected to the extra bandwidth (whatever may be left after the source stream) available to borrow from the access links. Real-time measurements may exploit the near-instantaneous available bandwidth on the links.

Without accurate knowledge of the access-link capacity and the available bandwidth on the access link, a service provider (SP) may have only one option: assume a "conservative" value for the parameters they do not know or cannot measure. The assumed values may be conservative, because for example, if there may be only 2 Mbps available on the access link and the SP sets 3 Mbps in the configuration, the outcome may be disastrous. Furthermore, the SPs may set common values across all customers, which may result in underutilization of the available resources for potentially many well-connected clients.

Similarly, if a client may get a worse-than-average downstream bandwidth, a blindly preset burst rate may easily congest the access link. For example, a parameter that may be used to determine the burst rate during the fast channel change may be set to 12% and 20% of the source stream for high-definition (HD) and standard-definition (SD) streams. This solution may be far from being optimal.

The SP may determine the access link capacities from a digital subscriber line access multiplexer (DSLAM) (or a cable modem termination system (CMTS), etc.). However, this information may be considered to be private and may not be shared. Thus, in some cases, a provider offering the IPTV service or another OTT provider may not know these values. Furthermore, in most cases, the system may be interested in the available bandwidth, not the capacity, which may be an unknown to the access provider. Thus, real-time measurement may often be the only solution. Even in cases where admission control is used to regulate the flows, estimation can still be useful.

Packet-dispersion methods (using Session Traversal Utilities for NAT (STUN) and/or Real-Time Transfer Protocol/RTP Control Protocol (RTP/RTCP)) for capacity and available bandwidth estimations may be employed on the network links and paths. For example, the access links may often be the most likely parts of the networks to get congested. Measuring the access link properties for each client separately may optimize the available resources for each of them. Using STUN may seamlessly handle any NAT traversal issues.

FIG. 1 illustrates an environment in which embodiments of the invention may be located. The network architecture includes a client computer 110 in communication with a server computer 120 over a network 130. The network 130 may include a local network or a wide area network (e.g., the Internet).

The client computer 110 may contain a processor programmed to request a bandwidth probe for the entirety of communications path between client computer 110 and server computer 120, or for a subsection of the path. The server computer 120 may contain a processor capable of sending a probing packet in accordance with embodiments of the invention. The server computer 120 may contain a memory 140 capable of storing received estimation results.

It should further be understood that the network architecture of FIG. 1 and its components include functionality to communicate with other computing devices, communication devices, and/or other systems and are not intended to be limited to the embodiments and examples described herein. Thus, for example, the network architecture of FIG. 1 may include additional client computers or other communication devices in communication with the server computer 120, in accordance with various embodiments.

Figure 2:
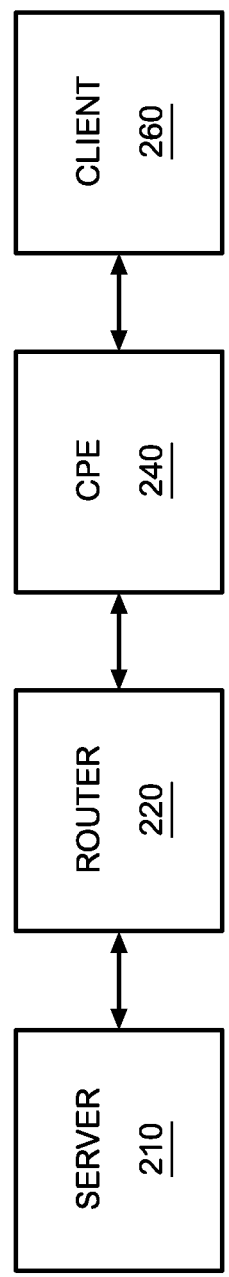
FIG. 2 is a block diagram showing network topology for operating embodiments of the invention.

FIG. 2 illustrates a topology for embodiments of the invention. A server 210 and a client 260 may reside on either end of a communications path. In this example, the forward path may be from server 210 to client 260. Server 210 may be in communications with a router 220. In some embodiments, there may be any number of routers 220 available in the communications path. The router 220 may be in communications with an IPTV set-top box 240. In some embodiments, IPTV set-top box 240 may be any consumer premises equipment on the communications network.

In some embodiments, a client associated with IPTV set-top box 240 may be already receiving an IPTV source stream, and the remaining capacity on the link between router 220 and IPTV set-top box 240 may determine the available bandwidth for operations such as error repair and fast channel change. The total link capacity between router 220 and IPTV set-top box 240 may be calculated and given the bitrate of the source stream, an upper bound for the available bandwidth may be computed.

In some embodiments, the capacity for a class which may carry the repair streams may be directly measured. This may allow for a close approximation for the available bandwidth for the identified class since packets belonging to different classes should not affect each other and should not interfere with the measurements or the actual transmission in other classes.

In some embodiments, a packet pair/train technique may perform measurements between any two end-points within the communications line through the use of Session Traversal Utilities for NAT (STUN) and/or Real-Time Transfer Protocol and/or RTP Control Protocol (RTP/RTCP) to make bandwidth estimations on the network links and paths. Thus, both server 210 and client 260 may implement embodiments of the present invention.

Measurements made according to embodiments of the present invention are described herein. Capacity ("C") may represent the minimum transmission rate among the all links on a path. C may be calculated as: $C = \min C\_i, i = \{0, 1, \ldots, H\}$ where $C\_i$ may indicate the transmission rate on a link i, H may be the number of links on the path, and $C\_0$ may be the sender's transmission rate. $C\_0$ may not be critical in some embodiments, as STUN and/or RTP/RTCP packets may be sent back to back.

Available Bandwidth ("A") may be the minimum capacity not used by other traffic among the all links on a path. $u\_i$ may indicate the utilization on link i, and A may be calculated as: $A = \min [C\_i \times (1 - u\_i)]$.

STUN and/or RTP/RTCP packet dispersion may also be measured according to embodiments of the present invention. For example, two probing packets (each with a size of L bytes) may be sent back to back from the sender to the receiver. $\Delta$ may denote the dispersion measured between the probing packets at the receiver side. If the amount of cross traffic introduced between the two probing packets may be minimal (or small enough to ignore), C is given as follows: $C = L/\Delta$.

The calculations may ensure that if no other links may be beyond the bottleneck link, STUN and/or RTP/RTCP packet dispersion cannot overestimate the capacity. While underestimation may still be possible, overestimation may potentially cause more serious problems than underestimation.

The choice of L (size of the probing STUN and/or RTP/RTCP packets) may be important since, as L gets larger, there may be a higher probability of cross traffic packets coming between the probing STUN and/or RTP/RTCP packets. However, it may be easier to measure dispersion with larger L values (which may be less sensitive to timer resolutions and noises in the queuing delays). Also, using a different value for L in subsequent measurements may result in better estimations.

In some embodiments, instead of two probing STUN and/or RTP/RTCP packets, N back-to-back STUN and/or RTP/RTCP probing packets may be used. Estimation of the capacity may be attempted from the average dispersion observed for each of the N STUN and/or RTP/RTCP packets. Often, longer packet trains (larger N) may underestimate the capacity. The result produced by the packet train may be the called average dispersion rate ("R"). R may be a lower bound for the capacity (i.e., R<=C) and an upper bound for the available bandwidth (i.e., R>=A).

In some embodiments of the present invention using IPTV applications, dispersion and packet train techniques may assume first-come-first-served (FCFS) regime. The STUN and/or RTP/RTCP packets belonging to the source and repair streams may be sent in different QoS classes. A source stream may have a higher priority compared to a repair stream, which may usually be transmitted in a best effort or a one-better class. However, in each class, the regime may usually be FCFS. Thus, dispersion and packet train techniques still may be effective.

Capacity of a path may be assumed to vary in the long term, but the available bandwidth may change instantaneously. The varying available bandwidth problem may be dealt with in some embodiments by using periodic (or on-demand) measurements.

No routing changes should happen during the measurements. This may not typically be a problem as usually there may only be one forward path in the access networks. However, cross traffic may interfere with the measurements. The amount of cross traffic (in the same QoS class) may be far less on an access link as compared to a core link. The aggregation link may also be problematic, but the capacity of an aggregation link may also be larger by a few orders of magnitude as compared to access links.

Figure 3:
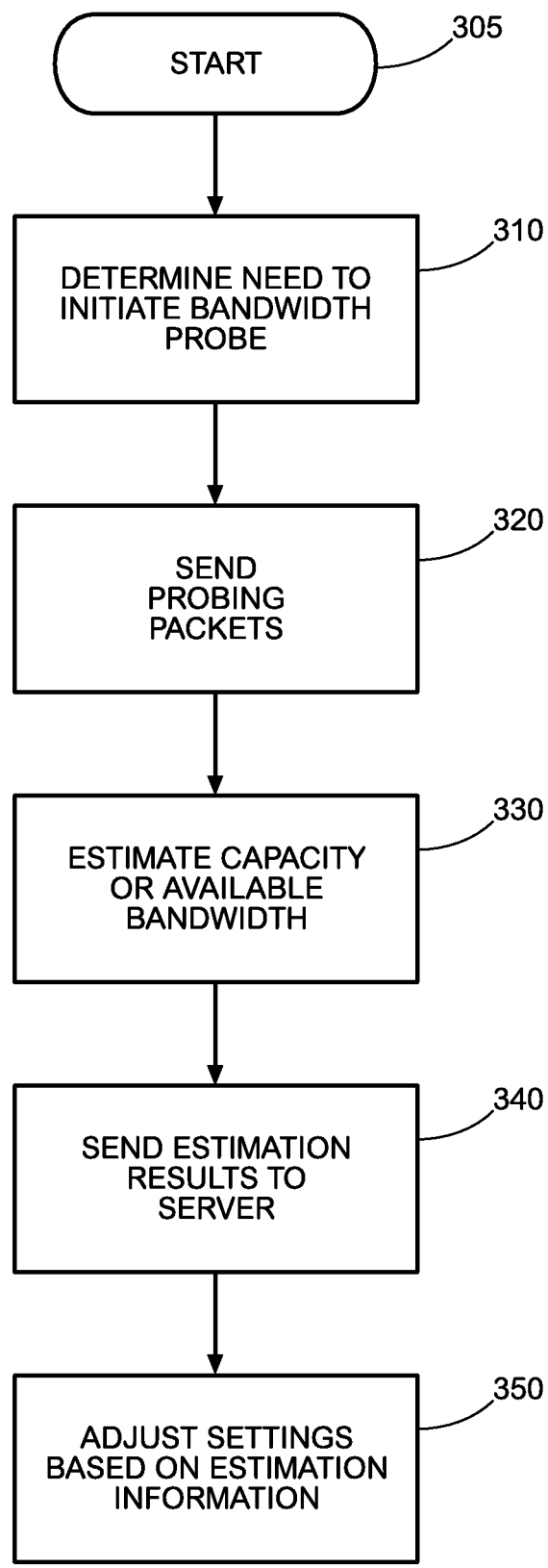
FIG. 3 is a flow chart illustrating operation of embodiments of the invention.

FIG. 3 illustrates a flow chart showing embodiments of the present invention. The method may start at step 305. The method may proceed to step 310 where a server, such as server 210 may determine, by any appropriate mechanism, that it needs to initiate a bandwidth probe. For example, a client, such as client 260 may send a measurement request to the server (either for a STUN and/or RTP/RTCP packet pair or a STUN and/or RTP/RTCP packet train with a length of N), including the size of the probing STUN and/or RTP/RTCP packet. Alternatively, the server may initiate periodic measurements.

The method may then proceed to step 320 where the server may send a STUN and/or RTP/RTCP packet pair (or a STUN and/or RTP/RTCP packet train based on the request) back to the client. The probing STUN and/or RTP/RTCP packets may contain unique identifiers so that the client may process them. After receipt of the STUN and/or RTP/RTCP packet pair, the method may proceed to step 330 where the client may estimate the capacity and/or available bandwidth, by recognizing the arrival time of the STUN and/or RTP/RTCP packet pair/train from the server.

The method then may proceed to step 340 where the client may subsequently send the estimations, identifiers and time information to the server. The server may remember each client's bandwidth information (the last X measurements) and may subsequently use this information appropriately. For example, the method may proceed to step 350 wherein a starting point for the burst and burst rate for a fast channel change may be adjusted accordingly. The method may end at step 360.

Figure 4:
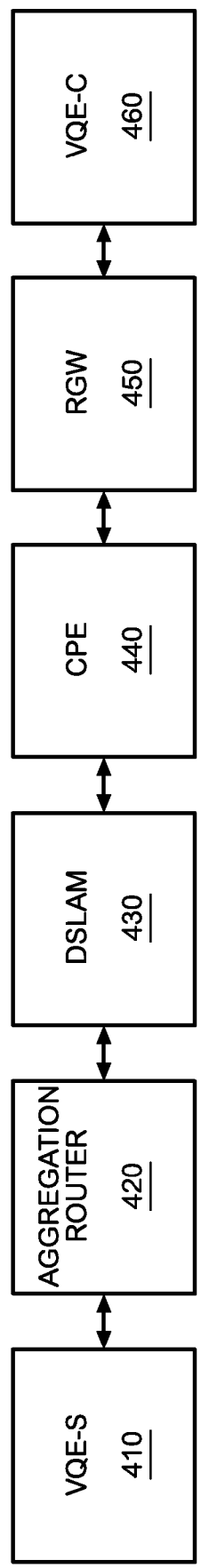
FIG. 4 is a block diagram showing network topology for operating embodiments of the invention.

FIG. 4 illustrates a topology for embodiments of the invention. A repair server 410 and a client 460 may reside on either end of a communications path. In this example, the forward path may be from repair server 410 to client 460. Repair server 410 may be in communications with an aggregation router 420. In some embodiments, there may be any number of aggregation or other types of routers 420 available in the communications path. Aggregation router 420 may be in communications with a DSLAM 430.

DSLAM 430 may be in communication with customer premises equipment (CPE) 440. In this topology, the link between DSLAM 430 and CPE 440 may be the bottleneck that determines the capacity of the illustrated forward path. If a client associated with CPE 440 may be already receiving a source stream, the remaining capacity on the link between DSLAM 430 and CPE 440 may determine the available bandwidth for error repair and fast channel change operations. Thus, after estimation of the total link capacity between DSLAM 430 and CPE 440 and given the bitrate of the source stream, an upper bound for the available bandwidth may be computed.

In some situations, the link between repair server 410 and aggregation router 420 and/or the link between aggregation router 420 and DSLAM 430 may be the bottleneck as well. CPE 440 may be in communications with a residential gateway (RGW) 450. RGW 250 may provide point of networking and control access to/from the CPE 440 in a home environment. RGW 450 may contain additional functions, such as firewalls and Network Address Translators (NATs). RGW 450 may further be in communications with client 460.

In some embodiments, a STUN and/or RTP/RTCP packet pair/train technique may perform measurements between any two end-points within the communications line. Some embodiments of the present invention may be implemented in products residing in RGW 450, e.g., Linksys boxes, to determine the related statistics for the path between repair server 410 and RGW 450. In most cases, the home network links will not be the bottleneck (although wireless may be problematic). Thus, in some embodiments, measurements for the path between repair server 410 and client 460 may be inferred. This may avoid overestimating available capacity.

Figure 5:
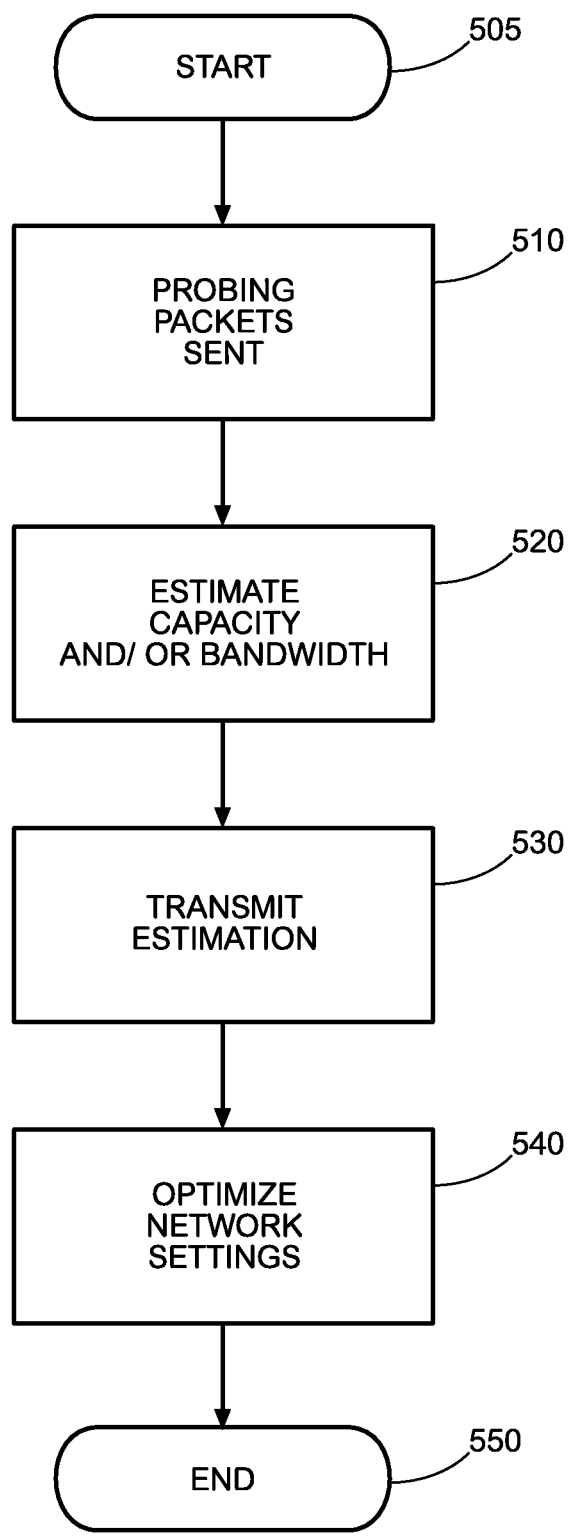
FIG. 5 is a flow chart illustrating operation of embodiments of the invention.

FIG. 5 illustrates a flow chart showing embodiments of the present invention. The method may start at step 505. The method may proceed to step 510 where a first computing device may send a STUN and/or RTP/RTCP packet pair (or a STUN and/or RTP/RTCP packet train based on the request) to a second computing device. The STUN and/or RTP/RTCP packets may pass through one or more routers or other computing devices on the network path. The STUN and/or RTP/RTCP packets may be sent by the first device in response to a measurement request. The STUN and/or RTP/RTCP probing packets may contain unique identifiers so that the second computing device may process them.

After receipt of the STUN and/or RTP/RTCP packet pair or train, the method may proceed to step 520 where the second computing device may estimate the capacity and/or available bandwidth, by recognizing the arrival time of the STUN and/or RTP/RTCP packet pair/train from the first computing device. In some embodiments capacity may represent the minimum transmission rate between two devices on the communications path between the first computing device and the second computing device.

This capacity may be calculated as the minimum capacity on a path between the two devices. If multiple links exist in the path between the two devices, the capacity may be the capacity of the link with the lowest transmission rate. The available bandwidth may be the minimum capacity not used by other traffic among the all links on the path between the two devices.

At step 520, packet dispersion may also be measured by sending two probing STUN and/or RTP/RTCP packets back to back from the first computing device to the second computing device. The size of the probing STUN and/or RTP/RTCP packets may increase the probability of cross traffic packets coming between the probing STUN and/or RTP/RTCP packets. In some embodiments, using a different STUN and/or RTP/RTCP packet size in subsequent measurements may result in better estimations.

In some embodiments, instead of two probing STUN and/or RTP/RTCP packets, a pre-determined number of probing STUN and/or RTP/RTCP packets may be used. Estimation of the capacity may then be attempted from the average dispersion observed for each of the STUN and/or RTP/RTCP packets used. This estimation may be a lower bound for the capacity and an upper bound for the available bandwidth.

The method then may proceed to step 530 where the second computing device may transmit the estimation to the first computing device. Once the first computing device receives the estimation, the method may proceed to step 540. At step 540, the first computing device may use these calculations to optimize networking operations. The method may end at step 550.

Figure 6:
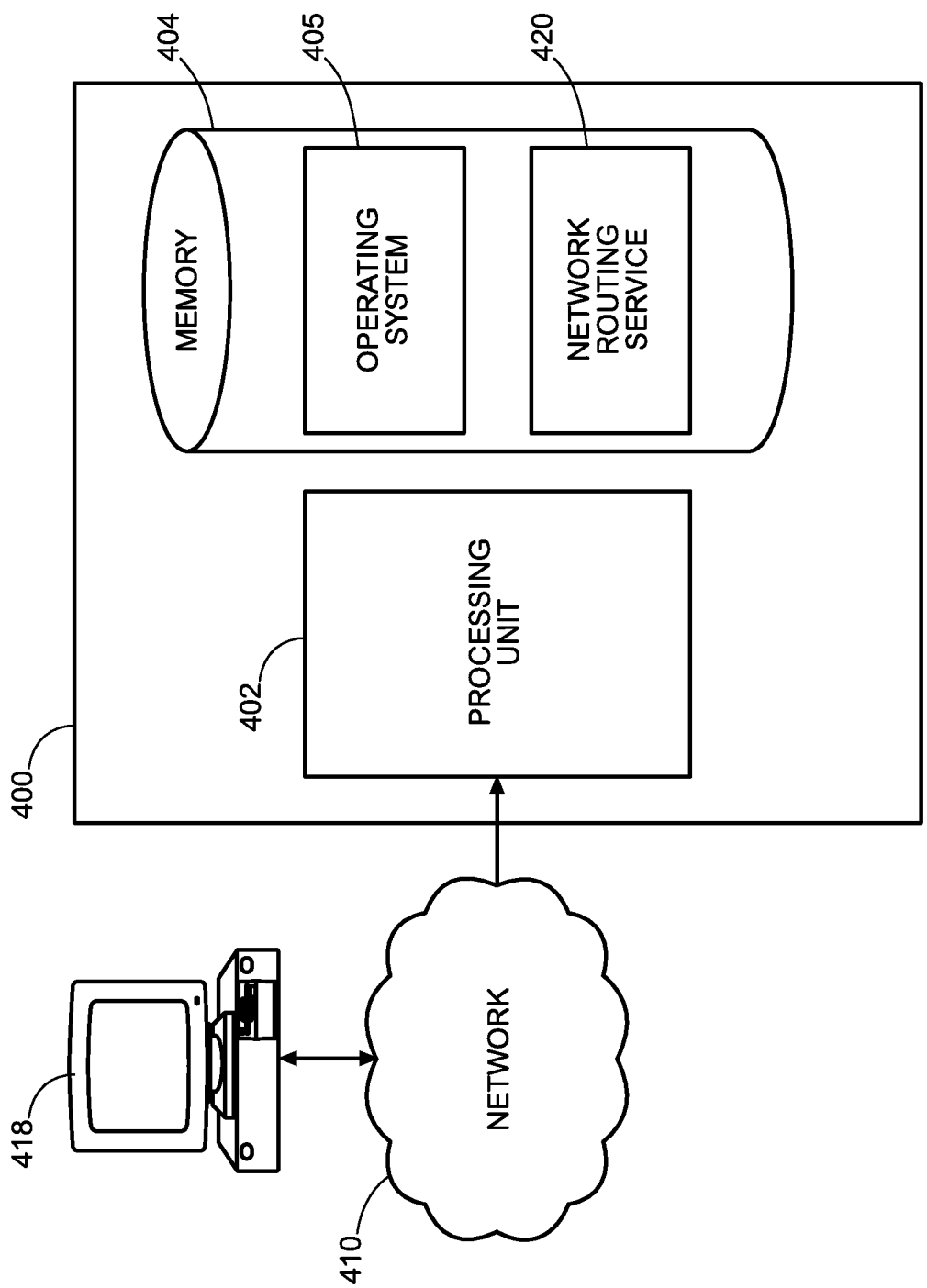
FIG. 6 is a block diagram of a system including a computing device.

FIG. 6 is a block diagram of a system including computing device 600. Consistent with an embodiment of the invention, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the invention. Furthermore, computing device 600 may comprise an operating environment for estimation of capacity and available bandwidth with packet dispersion as described above. The described system may operate in other environments and is not limited to computing device 600.

With reference to FIG. 6, a system consistent with an embodiment of the invention may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, and one or more programming modules such as a network routing service 620. Operating system 605, for example, may be suitable for controlling computing device 600's operation. In one embodiment, the programming modules may include programs that communicate via a network 610. Furthermore, embodiments of the invention may be practiced in conjunction with a graphics library, other operating systems, or any other application program and is not limited to any particular application or system.

Computing device 600 may have additional features or functionality. For example, computing device 600 may also include additional data storage devices (removable and/or non-removable) such as, for example, magnetic disks, optical disks, or tape. Computer storage media may include volatile and nonvolatile, removable and non-removable media implemented in any method or technology for storage of information, such as computer readable instructions, data structures, program modules, or other data. System memory 604, the removable storage, and the non-removable storage are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) such as a keyboard, a mouse, a pen, a sound input device, a touch input device, etc. Output device(s) such as a display, speakers, a printer, etc. may also be included. The aforementioned devices are examples and others may be used.

Computing device 600 may also contain a communication connection that may allow device 600 to communicate with other computing devices 618, such as over network 610 in a distributed computing environment, for example, an intranet or the Internet. The communication connection is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules (e.g. messaging application 608) may perform processes including, for example, one or more method 300 and 500's stages as described above. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

The methods and systems described may be embodied in any computer-readable medium for use by or in connection with an instruction execution system, apparatus, or device. Such instruction execution systems may include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Any software components illustrated herein are abstractions chosen to illustrate how functionality may partitioned among components in some embodiments disclosed herein. Other divisions of functionality may also be possible, and these other possibilities may be intended to be within the scope of this disclosure. Furthermore, to the extent that software components may be described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of some embodiments of the present invention. Alternatively, these diagrams may be viewed as depicting actions of an example of a method implemented by some embodiments of the invention. Blocks in these diagrams represent procedures, functions, modules, or portions of code which include one or more executable instructions for implementing logical functions or steps in the process. Alternate implementations may also be included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method comprising:
    sending a plurality of periodic measurement requests to a first computing device on a network, wherein the periodic measurement requests comprise requests to measure the capacity for a class which can carry a plurality of repair streams;
    receiving data responsive to the measurement requests at a second computing device, wherein the received data responsive to the measurement requests comprises a STUN or RTP/RTCP packet train of a requested length and an average dispersion between the STUN or RTP/RTCP packets in the packet train is measured, wherein the requested length differs in subsequent measurement requests, and wherein the Session Traversal Utilities for NAT (STUN) or Real-Time Transfer Protocol/RTP Control Protocol (RTP/RTCP) packets each have unique identifiers;
    estimating at least one of a capacity and an available bandwidth of a communications path from the first computing device to the second computing device based on the received data;
    sending the estimation to the first computing device;
    storing the estimation;
    sending the estimation to a remote quality monitoring tool remote from the first computing device and the second computing device; and
    adjusting transmission settings based on the estimation.

2. The method of claim 1, wherein the received data responsive to the measurement requests comprises two probing STUN or RTP/RTCP packets and the dispersion between the probing STUN or RTP/RTCP packets is measured.

3. The method of claim 2, wherein estimating at least one of a capacity and an available bandwidth comprises:
    analyzing an arrival time for the received data.

4. The method of claim 2, further comprising:
    determining a need to initiate a bandwidth probe, where the determination triggers sending the measurement requests to the first computing device.

5. The method of claim 2, further comprising:
    adjusting one of a transmission starting point and a transmission rate for a packet transmission to the first computing device based on the estimation.

6. The method of claim 1, wherein the received data is a dummy packet.

7. A system comprising:
    a server capable of initiating a bandwidth probe and of sending a plurality of periodic probing Real-Time Transfer Protocol/RTP Control Protocol (RTP/RTCP) packets to a client located across a wide area network in response to the bandwidth probe, wherein the periodic probing packets comprise requests to measure the capacity for a class which can carry a plurality of repair streams;
    a processor associated with the client programmed to estimate at least one of a capacity and an available bandwidth based on the received data, the processor further programmed to send the estimation results to the server;
    a memory capable of storing received estimation results, wherein the received estimation results comprises a RTP/RTCP packet train of a requested length and an average dispersion between the RTP/RTCP packets in the packet train is measured, wherein the requested length differs in subsequent measurement requests, and wherein the RTP/RTCP packets each have unique identifiers; and
    a processor associated with the server programmed to adjust transmission settings based on the estimation results.

8. The system of claim 7 wherein the server is further capable to initiate bandwidth probes at one of pre-determined time intervals or when it is determined that said probes are necessary.

9. The system of claim 7, wherein the processor associated with the client is further programmed to analyze an arrival time for the received data.

10. The system of claim 7, further comprising:
    one or more aggregation routers in communication with the server;
    a network access device in communication with the one or more aggregation routers;
    consumer premises equipment in communication with a digital subscriber line access multiplexer;
    wherein the processor associated with the server estimates the available bandwidth on the communication path between the digital subscriber line access multiplexer and the consumer premises equipment; and
    wherein the processor associated with the server determines an upper bound for available bandwidth on the communication path using the estimated available bandwidth on the communication path between the digital subscriber line access multiplexer and the consumer premises equipment and the bitrate of a source data stream.

11. The system of claim 10, wherein the processor associated with the server is further programmed to adjust transmission settings based on more than one estimation result stored in the memory.

12. The system of claim 10, wherein the processor associated with the server adjusts one of a transmission starting point and a transmission rate for a packet transmission to the computing device based on the estimation.

13. A non-transitory computer-readable medium which stores a set of instructions which when executed performs a method for analyzing network conditions, the method executed by the set of instructions comprising:
- determining that a bandwidth probe needs to be initiated based on a request, received from a client device, to initiate the bandwidth probe;
- initiating a bandwidth probe, wherein the bandwidth probe comprises a plurality of periodically sent the Session Traversal Utilities for NAT (STUN) or Real-Time Transfer Protocol/RTP Control Protocol (RTP/RTCP) packets, wherein the packets comprise requests to measure the capacity for a class which can carry a plurality of repair streams;
- estimating at least one of a capacity and an available bandwidth;
- storing the estimations, wherein the estimations comprise a RTP/RTCP packet train of a requested length and an average dispersion between the RTP/RTCP packets in the packet train is measured, wherein the requested length differs in subsequent measurement requests, and wherein the RTP/RTCP packets each have unique identifiers; and
- adjusting network transmission settings based on the estimation.

14. The non-transitory computer-readable medium of claim 13, further comprising:
- initiating a bandwidth probe for one of a plurality of links on a communications path between a content server and a consumer device.

15. The non-transitory computer-readable medium of claim 14, further comprising:
- initiating a bandwidth probe at pre-determined time intervals.

16. The non-transitory computer-readable medium of claim 13, further comprising:
- initiating a bandwidth probe upon receipt of a an on-demand request.

17. The non-transitory computer-readable medium of claim 13, further comprising:
- sending a request for the bandwidth probe via a first RTCP APP packet; and
- estimating at least one of a capacity and an available bandwidth.

18. The non-transitory computer-readable medium of claim 13, further comprising:
- adjusting transmission settings for an IPTV application.

19. The non-transitory computer-readable medium of claim 13, wherein the request, received from the client device, to initiate the bandwidth probe, comprises a size of the probing STUN or RTP/RTCP packets.

* * * * *